United States Patent
Lee et al.

(10) Patent No.: US 12,125,981 B2
(45) Date of Patent: Oct. 22, 2024

(54) ELECTROLYTE FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jung Min Lee, Daejeon (KR); Young Min Lim, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 567 days.

(21) Appl. No.: 17/603,991

(22) PCT Filed: Apr. 27, 2020

(86) PCT No.: PCT/KR2020/005506
§ 371 (c)(1),
(2) Date: Oct. 15, 2021

(87) PCT Pub. No.: WO2020/222478
PCT Pub. Date: Nov. 5, 2020

(65) Prior Publication Data
US 2022/0209295 A1  Jun. 30, 2022

(30) Foreign Application Priority Data

May 2, 2019 (KR) .................. 10-2019-0051437

(51) Int. Cl.
| | |
|---|---|
| H01M 10/0567 | (2010.01) |
| C07F 7/08 | (2006.01) |
| H01M 10/052 | (2010.01) |
| H01M 10/0525 | (2010.01) |
| H01M 10/0568 | (2010.01) |
| H01M 10/0569 | (2010.01) |
| H01M 10/42 | (2006.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 10/4235* (2013.01); *C07F 7/081* (2013.01); *H01M 10/052* (2013.01); *H01M 2300/0025* (2013.01); *H01M 2300/0028* (2013.01)

(58) Field of Classification Search
CPC ......... H01M 10/0567; H01M 10/0525; H01M 10/0568; H01M 10/0569; H01M 10/04235; H01M 10/052; H01M 2300/0025; H01M 2300/0028
See application file for complete search history.

(56) References Cited

U.S. PATENT DOCUMENTS

| | | | |
|---|---|---|---|
| 6,124,057 A | * | 9/2000 | Ito .................... H01M 4/62 429/231.95 |
| 2006/0269843 A1 | | 11/2006 | Usami et al. |
| 2008/0020287 A1 | | 1/2008 | Cho et al. |
| 2010/0248021 A1 | | 9/2010 | Park et al. |
| 2012/0202124 A1 | | 8/2012 | Jeon et al. |
| 2014/0242456 A1 | | 8/2014 | Taki et al. |
| 2014/0322596 A1 | | 10/2014 | Shatunov et al. |
| 2017/0301953 A1 | | 10/2017 | Pena Hueso et al. |
| 2018/0269524 A1 | | 9/2018 | Haufe et al. |
| 2019/0148773 A1 | | 5/2019 | Kim et al. |
| 2019/0326643 A1 | | 10/2019 | Peña Hueso et al. |

FOREIGN PATENT DOCUMENTS

| | | | |
|---|---|---|---|
| CN | 105428701 A | | 3/2016 |
| CN | 109075386 A | | 12/2018 |
| EP | 0853347 A1 | | 7/1998 |
| JP | 2000243440 A | | 9/2000 |
| JP | 2007012595 A | | 1/2007 |
| JP | 2016051697 A | | 4/2016 |
| JP | 2017538667 A | | 12/2017 |
| JP | 2018530871 A | | 10/2018 |
| KR | 20080004928 A | | 1/2008 |
| KR | 20120059436 A | | 6/2012 |
| KR | 20140067223 A | | 6/2014 |
| KR | 20140096263 A | | 8/2014 |
| KR | 20140127741 A | | 11/2014 |
| KR | 20160039484 A | | 4/2016 |
| KR | 2017028676 A | * | 3/2017 .......... H01M 10/052 |
| KR | 20170028676 A | | 3/2017 |
| KR | 20180050780 A | | 5/2018 |
| WO | 2018073694 A2 | | 4/2018 |

OTHER PUBLICATIONS

Search report from International Application No. PCT/KR2020/005506, mailed Aug. 7, 2020.
Extended European Search Report for Application No. 20799175.3 dated May 3, 2022, pp. 1-5.

* cited by examiner

*Primary Examiner* — Christopher P Domone
*Assistant Examiner* — Jonathan William Estes
(74) *Attorney, Agent, or Firm* — Lerner David LLP

(57) ABSTRACT

An electrolyte for a lithium secondary battery and a lithium secondary battery including the same are disclosed herein. In some embodiments, an electrolyte includes a lithium salt, an organic solvent, and at least one cyano silane-based compound selected from the group consisting of compounds represented by Formulae 1 to 3.

10 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/005506, filed on Apr. 27, 2020, which claims priority from Korean Patent Application No. 10-2019-0051437, filed on May 2, 2019, the disclosures of which are incorporated by reference herein.

TECHNICAL FIELD

The present invention relates to an electrolyte for a lithium secondary battery and a lithium secondary battery including the same, and more particularly, to an electrolyte for a lithium secondary battery, which may improve life characteristics and capacity characteristics even in a high-voltage operation, and a lithium secondary battery including the same.

BACKGROUND ART

Applications of lithium secondary batteries have been rapidly expanded from power sources of portable devices, such as mobile phones, notebook computers, digital cameras, and camcorders, to power sources of medium and large sized devices such as power tools, electric bicycles, hybrid electric vehicles (HEVs), and plug-in hybrid electric vehicles (plug-in HEVs, PHEVs). Appearance and size of the batteries have also changed in various ways as these application areas expand and demand increases, and better performance and stability than characteristics required in a conventional small battery are required. A lithium secondary battery is prepared by using materials capable of intercalating and deintercalating lithium ions as a negative electrode and a positive electrode, disposing a porous separator between the two electrodes, and then injecting a liquid electrolyte, wherein electricity is generated or consumed by oxidation and reduction reactions caused by the intercalation and deintercalation of the lithium ions into and from the positive electrode and the negative electrode.

With the recent expansion of the application areas, the demand for high energy density lithium secondary batteries has been increased, wherein, in order to achieve this demand, it is necessary to operate the lithium secondary battery at a high voltage. However, since a surface of the positive electrode is damaged by an oxidation decomposition reaction of the positive electrode at a high voltage, transition metal ions in the positive electrode may be dissolved. The transition metal ions dissolved in this case are reduced on a surface of the negative electrode to form dendrites on the surface of the negative electrode, and, accordingly, performance degradation of the lithium secondary battery may be accelerated.

Thus, there is a need to develop an electrolyte for a lithium secondary battery which may control the dissolution of the positive electrode transition metal ions by suppressing the oxidation decomposition reaction of the positive electrode even if the lithium secondary battery is operated at a high voltage.

PRIOR ART DOCUMENT

International Patent Application Publication No. 2018/073694

DISCLOSURE OF THE INVENTION

Technical Problem

An aspect of the present invention provides an electrolyte for a lithium secondary battery, which may suppress dissolution of transition metal ions in a positive electrode by minimizing a decomposition reaction on a surface of the positive electrode even in a case where the lithium secondary battery is operated under high-voltage and high-temperature conditions, and a lithium secondary battery including the same.

Technical Solution

According to an aspect of the present invention, there is provided an electrolyte for a lithium secondary battery which includes: a lithium salt; an organic solvent; and a cyano silane-based compound, wherein the cyano silane-based compound includes at least one selected from the group consisting of compounds represented by Formulae 1 to 3.

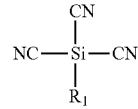

[Formula 1]

In Formula 1, $R_1$ is selected from the group consisting of hydrogen, a cyano group, and an alkyl group having 1 to 5 carbon atoms.

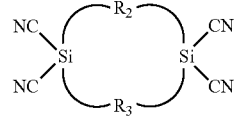

[Formula 2]

In Formula 2, $R_2$ and $R_3$ are each independently a direct bond or an alkylene group having 1 to 3 carbon atoms, and at least one of $R_2$ and $R_3$ is an alkylene group having 1 to 3 carbon atoms.

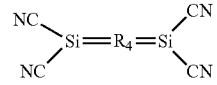

[Formula 3]

In Formula 3, $R_4$ is a direct bond, carbon, or an alkenyl group having 2 to 5 carbon atoms.

According to another aspect of the present invention, there is provided a lithium secondary battery including a positive electrode; a negative electrode; and the electrolyte for a lithium secondary battery.

Advantageous Effects

Since an electrolyte for a lithium secondary battery according to the present invention may minimize an oxidation decomposition reaction occurring on a surface of a positive electrode and may suppress dissolution of transition metal ions in the positive electrode even in a case where the lithium secondary battery is operated at a high voltage, the electrolyte for a lithium secondary battery may improve capacity characteristics and safety of the lithium secondary battery as well as energy density of the battery.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

<Electrolyte for Lithium Secondary Battery>

According to an embodiment, the present invention provides an electrolyte for a lithium secondary battery which includes: a lithium salt; an organic solvent; and a cyano silane-based compound, wherein the cyano silane-based compound includes at least one selected from the group consisting of compounds represented by Formulae 1 to 3.

(1) Lithium Salt

First, the lithium salt will be described.

The lithium salt is used as a medium for transferring ions in a lithium secondary battery. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$.

In this case, it is desirable that the lithium salt is included in a concentration of 0.1 M to 3 M, preferably 0.5 M to 2.5 M, and more preferably 0.5 M to 2 M in the electrolyte for a lithium secondary battery. In a case in which the lithium salt is included in an amount within the above range, an increase in resistance in the battery may be prevented by preventing decomposition of a solid electrolyte interphase (SEI) formed on an electrode interface when the battery is operated at a high voltage while minimizing a by-product generated by the dissolution of the lithium salt in the electrolyte.

(2) Organic Solvent

Next, the organic solvent will be described.

In the present invention, the organic solvent is a solvent commonly used in a lithium secondary battery, wherein, for example, an ether compound, an ester compound (acetates and propionates), an amide compound, a linear carbonate or cyclic carbonate compound, or a nitrile compound may be used alone or in mixture of two or more thereof.

Among them, a carbonate-based electrolyte solution solvent containing cyclic carbonate, linear carbonate, or a carbonate compound, as a mixture thereof, may be typically used.

Specific examples of the cyclic carbonate compound may be a single compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more thereof. Also, as specific examples of the linear carbonate compound, a compound selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof may be typically used, but the present invention is not limited thereto.

In particular, since propylene carbonate and ethylene carbonate, as cyclic carbonates among the carbonate-based electrolyte solution solvents, are highly viscous organic solvents and have high dielectric constants, the propylene carbonate and ethylene carbonate may well dissociate the lithium salt in the electrolyte solution, and, thus, the propylene carbonate and ethylene carbonate may be preferably used. Since an electrolyte solution having high electrical conductivity may be prepared when the above cyclic carbonate is mixed with low viscosity, low dielectric constant linear carbonate, such as ethylmethyl carbonate, diethyl carbonate, or dimethyl carbonate, in an appropriate ratio, the propylene carbonate and ethylene carbonate may be more preferably used.

Furthermore, as the ester compound among the organic solvents, a single compound selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone, or a mixture of two or more thereof may be used, but the present invention is not limited thereto.

(3) Cyano Silane-Based Compound

Next, the cyano silane-based compound will be described.

The cyano silane-based compound includes at least one cyano silane-based compound selected from the group consisting of compounds represented by Formulae 1 to 3 below.

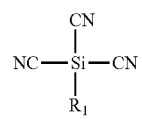

[Formula 1]

In Formula 1, $R_1$ is selected from the group consisting of hydrogen, a cyano group, and an alkyl group having 1 to 5 carbon atoms.

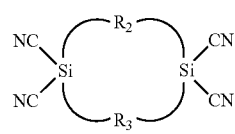

[Formula 2]

In Formula 2, $R_2$ and $R_3$ are each independently a direct bond or an alkylene group having 1 to 3 carbon atoms, and at least one of $R_2$ and $R_3$ is an alkylene group having 1 to 3 carbon atoms.

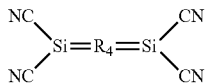

[Formula 3]

In Formula 3, $R_4$ is a direct bond, carbon, or an alkenyl group having 2 to 5 carbon atoms.

Specifically, the cyano silane-based compound may include the compound represented by Formula 1.

The cyano silane-based compounds represented by the compounds represented by Formulae 1 to 3 contain three or more cyano groups (CN), wherein, since the cyano group is an electron-withdrawing group with a high dipole moment, the cyano groups strongly bond with transition metals exposed on a surface of an electrode active material when the three or more cyano groups are included in a single compound.

Particularly, since a protective layer is formed on a surface of a positive electrode by the bonding, a side reaction between the positive electrode and the electrolyte may be suppressed. Also, if transition metal ions are dissolved from a positive electrode active material at a high voltage, the transition metal ions and the cyano silane-based compound may preferentially react to suppress reduction of the transition metal ions on a surface of a negative electrode.

When the cyano group is attached to a silicon (Si) element, since the reactivity with the transition metal ions is increased by abundant electrons of the silicon atom, the dissolution of the transition metal ions may be effectively suppressed.

Specifically, in Formula 1, $R_1$ may be selected from the group consisting of hydrogen, a cyano group, and an alkyl group having 1 to 4 carbon atoms. Also, in Formula 1, $R_1$ may be selected from the group consisting of hydrogen, a cyano group, —$CH_3$, —$CH_2CH_3$, —$CH(CH_3)_2$, and —$C(CH_3)_3$.

More specifically, the cyano silane-based compound represented by Formula 1 may include at least one cyano silane-based compound selected from the group consisting of compounds represented by Formulae 1-1 to 1-3 below.

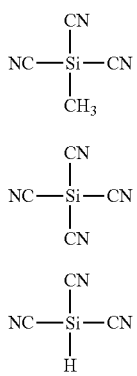

The cyano silane-based compound represented by Formula 2 may include at least one cyano silane-based compound selected from the group consisting of compounds represented by Formulae 2-1 to 2-4 below.

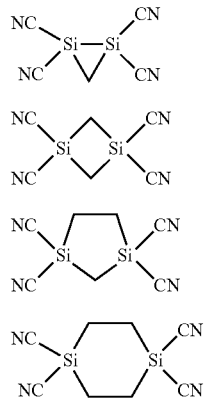

The cyano silane-based compound represented by Formula 3 may include at least one cyano silane-based compound selected from the group consisting of compounds represented by Formulae 3-1 to 3-3 below.

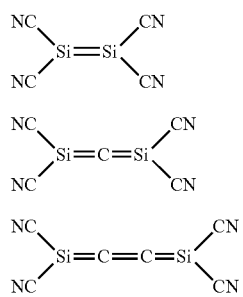

The cyano silane-based compound may be included in an amount of 0.1 part by weight to 10 parts by weight, preferably 0.5 part by weight to 5 parts by weight, and more preferably 1 part by weight to 4 part by weight based on 100 parts by weight of the electrolyte for a lithium secondary battery. If the cyano silane-based compound is included in an amount within the above range, the dissolution of the transition metal ions may be effectively suppressed while minimizing the increase in the resistance in the battery.

(4) Other Additives

The electrolyte for a lithium secondary battery according to an embodiment of the present invention may further include other additives which may form a stable film on the surfaces of the negative electrode and the positive electrode while not significantly increasing initial resistance in addition to the effect from the cyano silane-based compound, or which may act as a complementary agent for suppressing the decomposition of the solvent in the electrolyte for a lithium secondary battery and improving mobility of lithium ions.

These other additives are not particularly limited as long as these are additives capable of forming a stable film on the surfaces of the positive electrode and the negative electrode. As a representative example, the other additive may include at least one selected from the group consisting of a vinylene carbonate-based compound, a phosphate-based compound, a phosphite-based compound, a sulfite-based compound, a sulfone-based compound, a sulfate-based compound, a sultone-based compound, a halogen-substituted carbonate-based compound, a nitrile-based compound, a borate-based compound, and a lithium salt-based compound.

The vinylene carbonate-based compound is a component for assisting the formation of the SEI by being electrochemically decomposed on the surfaces of the positive electrode and the negative electrode, wherein an effect of improving long-term cycle life characteristics of the secondary battery may be achieved by the vinylene carbonate-based compound. As a representative example, the vinylene carbonate-based compound may include vinylene carbonate (VC) or vinylethylene carbonate (VEC).

The phosphate-based compound is a component for assisting the formation of the SEI by being electrochemically decomposed on the surfaces of the positive electrode and the negative electrode, wherein the effect of improving the long-term cycle life characteristics of the secondary battery may be achieved by the phosphate-based compound. As a representative example, the phosphate-based compound may include at least one compound selected from the group consisting of lithium difluoro(bisoxalato)phosphate, lithium difluorophosphate, tris(trimethylsilyl) phosphate (TMSPa), and tris(2,2,2-trifluoroethyl)phosphate (TFEPa).

The phosphite-based compound is a component for assisting the formation of the SEI by being electrochemically decomposed on the surfaces of the positive electrode and the negative electrode, wherein, as a representative example, the phosphite-based compound may include tris(trimethylsilyl) phosphite (TMSPi) or tris(trifluoroethyl) phosphite (TFEPi).

The sulfite-based compound may include at least one compound selected from the group consisting of ethylene sulfite, methylethylene sulfite, ethylethylene sulfite, 4,5-dimethylethylene sulfite, 4,5-diethylethylene sulfite, propylene sulfite, 4,5-dimethylpropylene sulfite, 4,5-diethylpropylene sulfite, 4,6-dimethylpropylene sulfite, 4,6-diethylpropylene sulfite, and 1,3-butylene glycol sulfite.

The sulfone-based compound may include at least one compound selected from the group consisting of divinyl sulfone, dimethyl sulfone, diethyl sulfone, methylethyl sulfone, and methylvinyl sulfone.

The sulfate-based compound may include ethylene sulfate (Esa), trimethylene sulfate (TMS), or methyl trimethylene sulfate (MTMS).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The halogen-substituted carbonate-based compound may include fluoroethylene carbonate (FEC).

Also, the nitrile-based compound may include at least one compound selected from the group consisting of succinonitrile (SN), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonit rile.

The borate-based compound may include LiBOB (lithium bis(oxalato)borate ($LiB(C_2O_4)_2$)) or lithium oxalyldifluoroborate.

The lithium salt-based compound is a compound different from the lithium salt included in the non-aqueous electrolyte solution, wherein the lithium salt-based compound may include at least one compound selected from the group consisting of $LiPO_2F_2$ and $LiBF_4$.

As the other additives, the above-listed compounds may be included alone or in a mixture of two or more thereof, and, specifically, total additives of the cyano silane-based compound and the other additives may be included in an amount of 20 parts by weight or less, for example, 10 parts by weight or less based on 100 parts by weight of the electrolyte for a lithium secondary battery. If the amount of the total additives of the additive and the other additives is greater than 20 parts by weight, a side reaction in the electrolyte may occur excessively during charge and discharge of the battery, and, since the additives, which were not sufficiently decomposed at high temperatures, may be present in the form of an unreacted material or precipitates to increase the initial resistance of the lithium secondary battery, life characteristics of the battery may be degraded.

<Lithium Secondary Battery>

Next, a lithium secondary battery according to the present invention will be described.

The lithium secondary battery according to an embodiment of the present invention includes a positive electrode, a negative electrode, and the electrolyte for a lithium secondary battery, and may selectively further include a separator which may be disposed between the positive electrode and the negative electrode. In this case, since the electrolyte for a lithium secondary battery is the same as described above, a detailed description thereof will be omitted.

An operating voltage of the lithium secondary battery according to the present invention is in a range of 4 V to 5 V, preferably 4.2 V to 5 V, and more preferably 4.3 V to 5 V. In a case in which the operating voltage range of the lithium secondary battery is the above range, available capacity for the positive electrode may be maximized to increase capacity of the lithium secondary battery and, accordingly, energy density may be improved. Even in the case that the operating voltage is within the above range, since the lithium secondary battery according to the present invention uses the electrolyte for a lithium secondary battery in which the cyano silane-based compounds represented by Formulae 1 to 3 are included, the corresponding compound strongly bonds with transition metals on the surface of the positive electrode by its high dipole moment to form a film on the surface of the positive electrode, and thus, the side reaction between the positive electrode and the electrolyte may be minimized. Also, transition metal ions are easily dissolved from the positive electrode in a high-voltage operation, wherein, since the transition metal ions and the cyano silane-based compound may preferentially react to suppress the reduction of the transition metal ions on the surface of the negative electrode, the cyano silane-based compound may contribute to the minimized of the capacity reduction, precipitation and side reaction.

The positive electrode may be prepared by coating a positive electrode collector with a positive electrode active material slurry including a positive electrode active material, a binder for an electrode, a conductive agent for an electrode, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. In this case, the positive electrode collector may have fine surface roughness to improve bonding strength with the positive electrode active material, and the positive electrode collector may be used in various shapes such as a film, a sheet, a foil, a net, a porous body, a foam body, a non-woven fabric body, and the like.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_{Z1}O_4$ (where $0<Z1<2$), etc.), lithium-nickel-cobalt-based oxide (e.g., $LiNi_{1-Y2}Co_{Y2}O_2$ (where $0<Y2<1$), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p1}Co_{q1}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<S1<1$, and $p3+q3+r3+S1=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$) or lithium nickel cobalt aluminum oxide (e.g., $LiNi_{0.8}Co_{0.15}Al_{0.05}O_2$ etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The binder for an electrode is a component that assists in the binding between the positive electrode active material and the electrode conductive agent and in the binding with the current collector. Specifically, the binder may include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene terpolymer, a sulfonated ethylene-propylene-diene terpolymer, a styrene-butadiene rubber, a styrene-butadiene rubber-carboxymethylcellulose (SBR-CMC), a fluoro rubber, various copolymers thereof, and the like.

The conductive agent for an electrode is a component for further improving the conductivity of the positive electrode active material. Any electrode conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent is included.

The negative electrode, for example, may be prepared by coating a negative electrode collector with a negative electrode active material slurry including a negative electrode active material, a binder for an electrode, a conductive agent for an electrode, and a solvent.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include at least one compounds selected from the group consisting of a silicon-based compound represented by $SiO_x$ ($0<x\leq2$), natural graphite, artificial graphite, graphite, a carbonaceous material; lithium-containing titanium composite oxide (LTO); metals (Me) such as tin (Sn), lithium (Li), zinc (Zn), Mg, cadmium (Cd), cerium (Ce), nickel (Ni), or Fe; alloys composed of the metals (Me); oxides of the metals (Me); and composites of the metals (Me) and carbon.

Since the binder for an electrode, the electrode conductive agent, and the solvent are the same as described above, detailed descriptions thereof will be omitted.

A typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator, and a polyolefin-based porous polymer film coated with inorganic particles (e.g.: $Al_2O_3$) or a typical porous nonwoven fabric, for example, a nonwoven fabric formed of high melting point glass fibers or polyethylene terephthalate fibers may be used, but the present invention is not limited thereto.

Hereinafter, the present invention will be described in more detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

1. Example 1

(Preparation of Electrolyte for Lithium Secondary Battery)

An electrolyte for a lithium secondary battery was prepared by adding 3 g of the compound represented by Formula 1-1 and 2 g of vinylene carbonate (hereinafter, referred to as VC), as other additive, to 95 g of an organic solvent (ethylene carbonate (EC):ethyl methyl carbonate (EMC)=3:7 volume ratio) in which 1 M $LiPF_6$ was dissolved.

(Lithium Secondary Battery Preparation)

A positive electrode active material ($LiCoO_2$; LCO), carbon black as a conductive agent, and polyvinylidene fluoride (PVDF), as a binder, were mixed in a weight ratio of 97:1.7:1.3 and then added to N-methyl-2-pyrrolidone (hereinafter, referred to as NMP), as a solvent, to prepare a positive electrode active material slurry with a solid content of 60 wt %. An about 12 μm thick aluminum (Al) thin film, as a positive electrode collector, was coated with the positive electrode active material slurry, dried, and roll-pressed to prepare a positive electrode.

A negative electrode active material (graphite), a styrene-butadiene rubber-carboxymethylcellulose (SBR-CMC) as a binder, and carbon black, as a conductive agent, were mixed in a weight ratio of 96:3.5:0.5 in distilled water, as a solvent, to prepare a negative electrode active material slurry (solid content: 50 wt %). A 6 μm thick negative electrode collector (Cu thin film) was coated with the negative electrode active material slurry, dried, and roll-pressed to prepare a negative electrode.

The positive electrode, the negative electrode, and a separator formed of polypropylene/polyethylene/polypropylene (PP/PE/PP) were stacked in the order of the positive electrode/separator/negative electrode, and, after the stacked structure was disposed in a pouch-type battery case, the electrolyte for a lithium secondary battery was injected to prepare a lithium secondary battery.

2. Example 2

An electrolyte for a lithium secondary battery and a lithium secondary battery were prepared in the same manner as in Example 1 except that 3 g of the compound represented by Formula 1-2 was added instead of 3 g of the compound represented by Formula 1-1.

3. Example 3

An electrolyte for a lithium secondary battery and a lithium secondary battery were prepared in the same manner as in Example 1 except that 0.5 g of the compound represented by Formula 1-1 was added to 99.5 g of an organic solvent.

4. Example 4

An electrolyte for a lithium secondary battery and a lithium secondary battery were prepared in the same manner as in Example 1 except that 5 g of the compound represented by Formula 1-1 was added to 95 g of an organic solvent.

COMPARATIVE EXAMPLES

1. Comparative Example 1

An electrolyte for a lithium secondary battery and a lithium secondary battery were prepared in the same manner as in Example 1 except that 2 g of VC was added as other additive to 98 g of an organic solvent.

2. Comparative Example 2

An electrolyte and a lithium secondary battery were prepared in the same manner as in Example 1 except that 3 g of trimethylsilane carbonitrile of the following Formula 4 was added instead of 3 g of the compound represented by Formula 1-1.

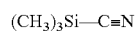
$(CH_3)_3Si-C\equiv N$  [Formula 4]

EXPERIMENTAL EXAMPLES

1. Experimental Example 1: High-Temperature (60° C.) Capacity Retention Measurement After formation was performed on each of the lithium secondary batteries prepared in Examples 1 to 4 and Comparative Examples 1 and 2 at a current of 24 mA (0.2 C rate), gas in the battery was removed (degassing process). After each lithium secondary battery having gas removed therefrom was moved to charge/discharge equipment at room temperature (25° C.), each lithium secondary battery was charged at 0.2 C rate to 4.45 V under a constant current/constant voltage condition, cut-off charged at 0.05 C, and discharged at 0.2 C to 3.0 V. In this case, after the above charge/discharge were performed two times, each lithium secondary battery was subsequently charged at 0.7 C rate to 4.45 V under a constant current/constant voltage condition, cut-off charged at 0.05 C, and then stored at 60° C. for 3 weeks.

Then, after each lithium secondary battery was moved to charge/discharge equipment at room temperature (25° C.), each lithium secondary battery was charged at 0.7 C rate to 4.45 V under a constant current/constant voltage condition, cut-off charged at 0.05 C, and discharged at 0.2 C to 3.0 V. After the above charge/discharge were performed three times, discharge capacity after high-temperature storage was measured using PNE-0506 charge/discharge equipment (manufacturer: PNE SOLUTION Co., Ltd., 5 V, 6 A)). The measured discharged capacity after high-temperature storage and initial design discharge capacity (120 mAh) were compared to calculate high-temperature storage capacity retention (%), and the results thereof are presented in Table 1.

TABLE 1

| | Discharge capacity (mAh) after high-temperature storage | High-temperature storage capacity retention (%) |
|---|---|---|
| Example 1 | 109.4 | 91.2 |
| Example 2 | 110.2 | 91.8 |
| Example 3 | 104.6 | 87.2 |
| Example 4 | 106.4 | 88.7 |
| Comparative Example 1 | 93.0 | 77.5 |
| Comparative Example 2 | 95.0 | 79.2 |

Referring to Table 1, it may be confirmed that discharge capacities after high-temperature storage and capacity retentions of the lithium secondary batteries of Examples 1 to 4, which included the electrolyte for a lithium secondary battery containing the cyano silane-based compound of the present invention, were better than those of the lithium secondary battery of Comparative Example 1 to which the cyano silane-based compound was not added and those of the lithium secondary battery of Comparative Example 2 to which the silane-based compound substituted with only one cyano group was added.

The invention claimed is:

1. An electrolyte for a lithium secondary battery, the electrolyte comprising:
    a lithium salt;
    an organic solvent; and
    a cyano silane-based compound,
    comprising at least one selected from the group consisting of the compound represented by Formula 1

[Formula 1]

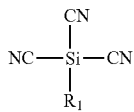

wherein, in Formula 1, $R_1$ is selected form the group consisting of hydrogen, a cyano group, and an alkyl group having 1 to 5 carbon atoms.

2. The electrolyte for a lithium secondary battery of claim 1, wherein the cyano silane-based compound comprises the compound represented by Formula 1.

3. The electrolyte for a lithium secondary battery of claim 1, wherein, in Formula 1, $R_1$ is selected from the group consisting of hydrogen, a cyano group, and an alkyl group having 1 to 4 carbon atoms.

4. The electrolyte for a lithium secondary battery of claim 1, wherein, in Formula 1, $R_1$ is selected from the group consisting of hydrogen, a cyano group, $-CH_3$, $-CH_2CH_3$, $-CH(CH_3)_2$, and $-C(CH_3)_3$.

5. The electrolyte for a lithium secondary battery of claim 1, wherein the compound represented by Formula 1 comprises at least one selected from the group consisting of compounds represented by Formulae 1-1 to 1-3

[Formula 1-1]

[Formula 1-2]

[Formula 1-3]

6. The electrolyte for a lithium secondary battery of claim 1, wherein the cyano silane-based compound is present in an amount of 0.1 part by weight to 10 parts by weight based on 100 parts by weight of the electrolyte.

7. The electrolyte for a lithium secondary battery of claim 1, wherein the cyano silane-based compound is present in an amount of 0.5 part by weight to 5 parts by weight based on 100 parts by weight of the electrolyte.

8. The electrolyte for a lithium secondary battery of claim 1, wherein the cyano silane-based compound is present in an amount of 1 part by weight to 4 parts by weight based on 100 parts by weight of the electrolyte.

9. A lithium secondary battery, comprising:
    a positive electrode;
    a negative electrode; and
    the electrolyte of claim 1.

10. The lithium secondary battery of claim 9, wherein the battery has an operating voltage in a range of 4 V to 5 V.

* * * * *